US012126106B2

(12) United States Patent
Nishijima

(10) Patent No.: US 12,126,106 B2
(45) Date of Patent: Oct. 22, 2024

(54) FEMALE TERMINAL

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventor: Seido Nishijima, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 79 days.

(21) Appl. No.: 17/629,725

(22) PCT Filed: Jul. 20, 2020

(86) PCT No.: PCT/JP2020/028116

§ 371 (c)(1),
(2) Date: Jan. 24, 2022

(87) PCT Pub. No.: WO2021/029188

PCT Pub. Date: Feb. 18, 2021

(65) Prior Publication Data

US 2022/0294142 A1 Sep. 15, 2022

(30) Foreign Application Priority Data

Aug. 9, 2019 (JP) ................................ 2019-148033

(51) Int. Cl.
*H01R 13/11* (2006.01)
*H01R 13/15* (2006.01)
(Continued)

(52) U.S. Cl.
CPC ............ *H01R 13/11* (2013.01); *H01R 13/15* (2013.01); *H01R 13/193* (2013.01); *H01R 13/20* (2013.01)

(58) Field of Classification Search
None
See application file for complete search history.

(56) References Cited

U.S. PATENT DOCUMENTS 3,753,193 A 8/1973 Teagno et al.
5,896,624 A * 4/1999 Horswell ............... B42F 1/006 24/67.5

(Continued)

FOREIGN PATENT DOCUMENTS

EP 1729372 A1 12/2006
JP S48-012487 A 2/1973

(Continued)

OTHER PUBLICATIONS

International Search Report dated Sep. 29, 2020 for WO 2021/029188 A1 (4 pages).

*Primary Examiner* — Ross N Gushi
(74) *Attorney, Agent, or Firm* — Venjuris, P.C.

(57) ABSTRACT

A female terminal includes a male terminal inserting tube portion constituting a connecting portion by an inner surface to be press-fit by a male terminal, a pair of overlapping plate portions connected to a pair of first divided portions of the male terminal inserting tube portion, separated from each other and projecting outward, and a clip having a coupling plate portion, a pair of sandwiching plate portions and an insertion opening between projecting end parts of the pair of sandwiching plate portions. The pair of overlapping plate portions press-fit between the pair of sandwiching plate portions through the insertion opening of the clip are biased to be overlapped each other between the pair of sandwiching (Continued)

plate portions by resilient restoring forces of the pair of sandwiching plate portions.

5 Claims, 4 Drawing Sheets

(51) Int. Cl.
*H01R 13/193* (2006.01)
*H01R 13/20* (2006.01)

(56) References Cited

U.S. PATENT DOCUMENTS

| | | | | |
|---|---|---|---|---|
| 6,648,701 B2 * | 11/2003 | Mouissie | H01R 11/286 439/760 |
| 7,614,921 B2 * | 11/2009 | Sikora | H01R 11/286 439/756 |
| 2019/0115679 A1 * | 4/2019 | Balser | H01R 13/434 |

FOREIGN PATENT DOCUMENTS

| | | |
|---|---|---|
| JP | S49-028186 U | 3/1974 |
| JP | S62-175579 U | 11/1987 |
| JP | 2011-238558 A | 11/2011 |

* cited by examiner

FEMALE TERMINAL

CROSS REFERENCE TO RELATED APPLICATIONS

This application is a national phase of PCT application No. PCT/JP2020/028116, filed on 20 Jul. 2020, which claims priority from Japanese patent application No. 2019-148033, filed on 9 Aug. 2019, all of which are incorporated herein by reference.

TECHNICAL FIELD

The present disclosure relates to a female terminal and particularly to a female terminal conductively connectable to a male terminal with a large contact pressure.

BACKGROUND

Conventionally, a female terminal including a box-shaped case having an opening in a side edge part and a pair of deflectable and deformable connecting portions projecting toward the inside of the case as described in Japanese Patent Laid-open Publication No. 2011-238558 (Patent Document 1) is known as a female terminal used in an electrical system of an automotive vehicle or the like. Such a female terminal is configured such that the male terminal and the connecting portions of the female terminal are electrically connected with a large contact pressure by mounting a separate spring member for applying biasing forces to the pair of connecting portions in directions to bring the connecting portions closer after the male terminal is inserted into the case through the opening as shown in FIG. 8 of Patent Document 1.

PRIOR ART DOCUMENT

Patent Document

Patent Document 1: JP 2011-238558 A

SUMMARY OF THE INVENTION

Problems to be Solved

In such a female terminal having a conventional structure, the separate spring member needs to be mounted after the male terminal is inserted into the case through the opening. Thus, a work step is increased and workability may be deteriorated.

Accordingly, it is aimed to provide a female terminal of a novel structure capable of realizing a high contact pressure between male and female terminals by excellent workability.

Means to Solve the Problem

The present disclosure is directed to a female terminal with a female terminal fitting including a connecting portion to be conductively connected to a male terminal, a male terminal inserting tube portion provided in the female terminal fitting, the male terminal inserting tube portion constituting the connecting portion by an inner surface to be press-fit by the male terminal, a pair of overlapping plate portions connected to a pair of first divided portions provided by dividing the male terminal inserting tube portion over an entire length in an axial direction at one circumferential position, the pair of overlapping plate portions being separated from each other and projecting outward, and a clip held on the female terminal fitting, the clip including a coupling plate portion and a pair of sandwiching plate portions projecting in directions approaching each other from both side edge parts of the coupling plate portion, a clearance between projecting end parts of the pair of sandwiching plate portions serving as an insertion opening, wherein the pair of overlapping plate portions press-fit between the pair of sandwiching plate portions through the insertion opening of the clip are biased to be overlapped each other between the pair of sandwiching plate portions by resilient restoring forces of the pair of sandwiching plate portions, and the male terminal inserting tube portion is resiliently deformed in a diameter expanding direction against the resilient restoring forces of the pair of sandwiching plate portions and the male terminal is allowed to be press-fit into the male terminal inserting tube portion when the male terminal is press-fit into the male terminal inserting tube portion.

Effect of the Invention

According to the present disclosure, it is possible to provide a female terminal capable of realizing a high contact pressure between male and female terminals by excellent workability.

DETAILED DESCRIPTION TO EXECUTE THE INVENTION

Description of Embodiments of Present Disclosure

Figure 1:
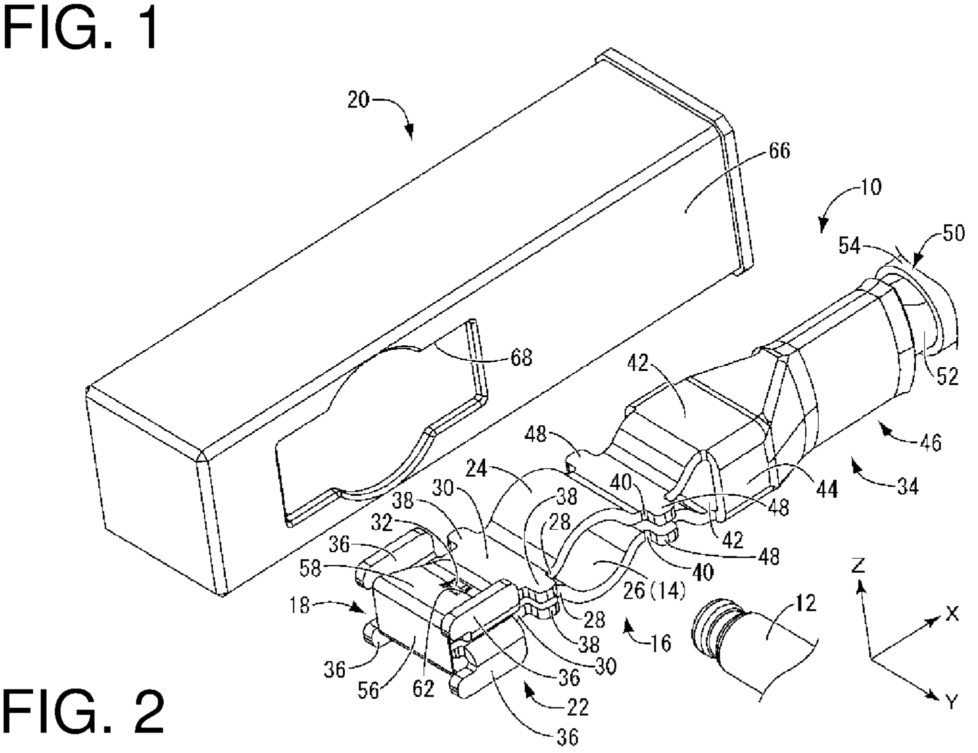
FIG. 1 is a perspective view of a female terminal according to a first embodiment.
Figure 2:
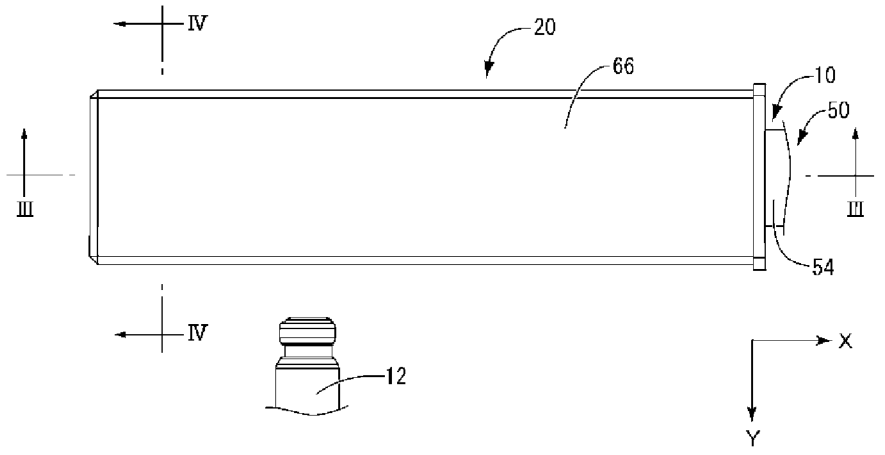
FIG. 2 is a plan view showing a state where the female terminal shown in FIG. 1 is accommodated in a housing.

First, embodiments of the present disclosure are listed and described.

(1) The female terminal of the present disclosure is provided with a female terminal fitting including a connecting portion to be conductively connected to a male terminal, a male terminal inserting tube portion provided in the female terminal fitting, the male terminal inserting tube portion constituting the connecting portion by an inner surface to be press-fit by the male terminal, a pair of overlapping plate portions connected to a pair of first divided portions provided by dividing the male terminal inserting tube portion over an entire length in an axial direction at one circumferential position, the pair of overlapping plate portions being separated from each other and projecting outward, and a clip held on the female terminal fitting, the clip including a coupling plate portion and a pair of sandwiching plate portions projecting in directions approaching each other from both side edge parts of the coupling plate portion, a clearance between projecting end parts of the pair of sandwiching plate portions serving as an insertion opening, wherein the pair of overlapping plate portions press-fit between the pair of sandwiching plate portions through the insertion opening of the clip are biased to be overlapped each other between the pair of sandwiching plate portions by resilient restoring forces of the pair of sandwiching plate portions, and the male terminal inserting tube portion is resiliently deformed in a diameter expanding direction against the resilient restoring forces of the pair of sandwiching plate portions and the male terminal is allowed to be press-fit into the male terminal inserting tube portion when the male terminal is press-fit into the male terminal inserting tube portion.

According to the female terminal of the present disclosure, the male terminal inserting tube portion provided in the female terminal fitting is provided with the pair of first divided portions by being divided over the entire length in the axial direction at one circumferential position, and the pair of overlapping plate portions are connected to the first divided portions and separated from each other and project outward. By press-fitting the pair of overlapping plate portions between the pair of sandwiching plate portions of the clip held on the female terminal fitting, the pair of sandwiching plate portions are resiliently deformed in directions separating from each other, and the pair of overlapping plate portions can be interposed between the pair of sandwiching plate portions. As a result, the pair of overlapping plate portions are biased to be brought closer to each other in overlapping directions by the resilient restoring forces of the pair of sandwiching plate portions. In this way, the pair of first divided portions of the male terminal inserting tube portion are brought closer to each other and resiliently deformed in the overlapping directions, and the male terminal inserting tube portion is held in a diameter reduced state by the resilient restoring forces of the pair of sandwiching plate portions of the clip. When the male terminal is press-fit into the male terminal inserting tube portion thereafter, the male terminal inserting tube portion is resiliently deformable in the diameter expanding direction against the resilient restoring forces of the pair of sandwiching plate portions of the clip. Thus, the male terminal is allowed to be press-fit into the male terminal inserting tube portion. In the female terminal of this aspect structured as just described, forces are applied in a diameter reducing direction to the male terminal inserting tube portion by the resilient restoring forces of the pair of sandwiching plate portions of the clip. Therefore, the connecting portion constituted by the inner surface of the male terminal inserting tube portion can be brought into contact with the male terminal press-fit into the male terminal inserting tube portion with a large contact pressure.

Further, since the clip is held on the female terminal fitting, it is not necessary to mount a separate spring member or the like to sandwich conductively connected parts after the male terminal is conductively connected to the female terminal like a conventional structure. Therefore, a work process can be simplified and a high contact pressure between the male and female terminals can be realized by excellent workability.

Further, when the male terminal is press-fit into the male terminal inserting tube portion, the male terminal inserting tube portion is allowed to be resiliently deformed in the diameter expanding direction against the resilient restoring forces of the pair of sandwiching plate portions of the clip. Therefore, a press-contact state can be stably maintained while an insertion force in inserting the male terminal into the connecting portion of the female terminal is advantageously reduced.

Moreover, when a certain external force is applied to the male terminal, this external force is transmitted in a radially outward direction of the male terminal inserting tube portion. Thus, a transmission direction of the external force is different from the overlapping directions, which are biasing directions of the pair of overlapping plate portions by the clip. Therefore, a variation of the contact pressure between the male and female terminals due to the external force transmitted to the male terminal can be advantageously reduced or prevented, and an improvement in conduction stability between the male and female terminals can also be ensured.

The clip for biasing the pair of overlapping plate portions into a mutually overlapping state has a simple configuration including the coupling plate portion and the pair of sandwiching plate portions projecting in the directions approaching each other from the both side edge parts of the coupling plate portion. Therefore, the complication of the structure caused by holding the clip on the female terminal fitting and the enlargement of the female terminal itself can be advantageously avoided and a compact female terminal capable of realizing both a reduction in the insertion force of the male terminal and an improvement in the contact pressure with the male terminal can be provided by a simpler structure.

(2) Preferably, the clip is held on the female terminal fitting by engagement of lock holes provided in either the pair of sandwiching plate portions or the pair of overlapping plate portions, the pair of sandwiching plate portions being respectively overlapped on the pair of overlapping plate portions, and lock claws provided on the others.

By a simple structure of providing the lock holes in either the respective sandwiching plate portions or the respective overlapping plate portions to be overlapped each other and providing the lock claws on the others, the clip can be held on the pair of overlapping plate portions of the female terminal fitting by the engagement of the lock holes and the lock claws. In this way, the structure can be further simplified and the female terminal can be reduced in size.

(3) Preferably, tip parts in a projecting direction of the pair of overlapping plate portions are sandwiched between the pair of sandwiching plate portions of the clip, and both side end parts in a width direction of the tip parts of the pair of overlapping plate portions are bent toward sides opposite to the overlapping directions, thereby providing pairs of protection wall portions arranged outwardly of the pair of sandwiching plate portions of the clip in the width direction.

The pairs of protection wall portions are provided by bending the both widthwise side end parts of the tip parts in the projecting direction of the pair of overlapping plate portions toward the sides opposite to the overlapping directions of the pair of overlapping plate portions. By mounting the clip on the tip parts of the pair of overlapping plate portions located between the pairs of protection wall portions, both widthwise sides of the pair of sandwiching plate portions of the clip can be protected by the pairs of the protection wall portions. In this way, the interference of the clip and other members and troubles such as the detachment of the clip from the female terminal fitting due to the application of an external force can be reduced or eliminated. Further, the pairs of the protection wall portions can also achieve a function as guides in mounting the clip on the pair of overlapping plate portions, and the assembling workability of the female terminal can also be improved.

(4) In (3) described above, outer surfaces of the pairs of protection wall portions preferably constitute contact supporting surfaces to be brought into contact with and supported by an inner surface of a housing into which the female terminal fitting is accommodated.

The outer surfaces of the pairs of protection wall portions constitute the contact supporting surfaces to be brought into contact with and supported by the inner surface of the housing into which the female terminal fitting is accommodated, whereby the female terminal fitting can be stably held in the housing. Therefore, a displacement of the female terminal and the like in inserting the male terminal into the male terminal inserting tube portion can be prevented, and the smooth insertion of the male terminal into the male terminal inserting tube portion can be stably maintained. Further, the insertion force of the male terminal into the male terminal inserting tube portion can be dispersed to the side of the housing and the durability of the female terminal and the like can also be improved.

(5) Preferably, the female terminal fitting further includes a pair of second divided portions provided by dividing the male terminal inserting tube portion over the entire length in the axial direction at another circumferential position and a pair of extending plate portions connected to the pair of second divided portions and projecting outward, and extending end parts of the pair of extending plate portions are connected to a wire crimping portion provided in a base end part of the female terminal fitting and the pair of extending plate portions are arranged to face each other across a clearance over an entire length.

The second divided portions extending over the entire length in the axial direction are provided at the other circumferential position of the male terminal inserting tube portion, and the pair of extending plate portions connected to the second divided portions and projecting outward are connected to the wire crimping portion provided in the base end part of the female terminal fitting. In this way, the male terminal inserting tube portion can be easily resiliently deformed and the insertion force of the male terminal into the male terminal inserting tube portion can be reduced. In addition, the pair of extending plate portions are arranged to face each other across the clearance over the entire length, and connected to the wire crimping portion provided in the base end part of the female terminal fitting. Therefore, the pair of extending plate portions can be easily connected to the wire crimping portion having a relatively large diameter and it can be advantageously avoided that the deformation of the male terminal inserting tube portion in the diameter expanding direction is hindered by the contact of the pair of extending plate portions to increase the insertion force.

Note that the circumferential position of the second divided portions provided in the male terminal inserting tube portion can be arbitrarily set depending on conditions such as an arrangement region of the female terminal. For example, the second divided portions may be provided at such a position as to face the first divided portions in an axis orthogonal direction of the male terminal inserting tube portion or may be provided at such a position that the first divided portions and the second divided portions are separated by 90° in a circumferential direction of the male terminal inserting tube portion and the overlapping plate portions and the extending plate portions project in directions orthogonal to each other.

Details of Embodiment of Present Disclosure

A specific example of a female terminal of the present disclosure is described below with reference to the drawings. Note that the present disclosure is not limited to these illustrations and is intended to be represented by claims and include all changes in the scope of claims and in the meaning and scope of equivalents.

First Embodiment

Hereinafter, a first embodiment of the present disclosure is described with reference to FIGS. 1 to 6. FIGS. 1 to 6 show a female terminal 10 according to the first embodiment of the present disclosure. The female terminal 10 includes a female terminal fitting 16 having a connecting portion 14 to be conductively connected to a male terminal 12 having a substantially hollow cylindrical pin shape. The female terminal 10 also includes a clip 18 to be held by being assembled with the female terminal fitting 16. Moreover, the female terminal 10 is used by being accommodated in a housing 20. Note that, in the following description, a Z direction, a Y direction and an X direction are referred to as an upward direction, a width direction and a length direction. Further, for a plurality of identical members, only some members may be denoted by a reference sign and the other members may not be denoted by the reference sign.

<Female Terminal Fitting 16>

Figure 3:
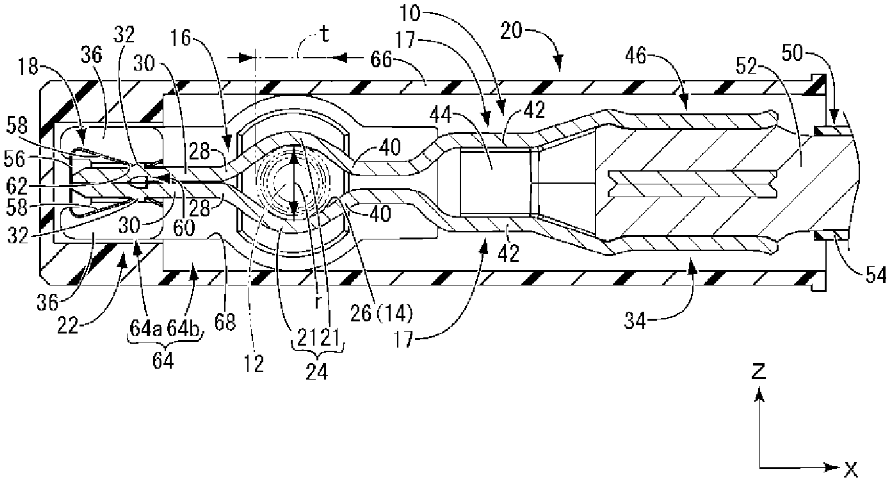
FIG. 3 is a section along in FIG. 2.

As shown in FIGS. 1, 3, 4 and 6, the female terminal fitting 16 is formed by press-working a metal plate material into a predetermined shape. A metal having a low electrical resistance such as copper, copper alloy, aluminum or aluminum alloy can be appropriately selected as a metal constituting the female terminal fitting 16. As shown in FIG. 3, the female terminal fitting 16 includes a pair of projecting pieces 17, 17 projecting from the side of a later-described wire crimping portion 46 toward a tip side (left side in FIGS. 3 and 6). The pair of projecting pieces 17, 17 are arranged to face each other across a clearance and provided with a pair of curved portions 21, 21 curved in directions to be convex toward sides opposite to facing directions in substantially central parts in the length direction thereof. The pair of curved portions 21, 21 are arranged to face each other, whereby a substantially hollow cylindrical male terminal inserting tube portion 24 is formed. The male terminal inserting tube portion 24 is open on both sides in the width direction of the female terminal fitting 16 and has a maximum inner diameter r smaller than a maximum outer diameter t of the male terminal 12. In this way, the male terminal inserting tube portion 24 is so configured that the male terminal 12 is press-fit thereinto, and the connecting portion 14 is constituted by an inner surface 26 of the male terminal inserting tube portion 24. A pair of first divided portions 28, 28 divided over the entire length in an axial direction (direction perpendicular to the plane of FIG. 3) of the male terminal inserting tube portion 24 are formed at one circumferential position of the male terminal inserting tube portion 24 by mutually facing peripheral end parts of the pair of curved portions 21, 21 located on the side of a tip part 22 in the length direction of the female terminal fitting 16. A pair of overlapping plate portions 30, 30 are provided which are connected to the pair of first divided portions 28, 28 and separated from each other and project outward (leftward in FIG. 3).

Lock claws 32 having a substantially triangular cross-section are provided to project outward on the upper surface of the upper overlapping plate portion 30 and the lower surface of the lower overlapping plate portion 30 in central parts of the pair of overlapping plate portions 30, 30. A surface of the lock claw 32 on the side of the tip part 22 of the female terminal fitting 16 is a tapered surface, and a surface thereof on the side of a base end part 34 of the female terminal fitting 16 is a vertical surface extending in the vertical direction. A pair of protection wall portions 36, 36 substantially in the form of rectangular flat plates are provided by bending both widthwise side end parts upward, which is opposite to an overlapping direction, on the side of the tip part 22 in a projecting direction of the upper overlapping plate portion 30. Further, a pair of protection wall portions 36, 36 similarly substantially in the form of rectangular flat plates are provided by bending both widthwise side end parts downward, which is opposite to an overlapping direction, on the side of the tip part 22 in a projecting direction of the lower overlapping plate portion 30. Moreover, pairs of projections 38, 38 are formed by both widthwise side end parts projecting outward in the width direction and substantially in the form of rectangular flat plates in a plan view on the sides of the base end part 34 of the pair of overlapping plate portions 30, 30, and are engaged with an unillustrated male terminal cover.

A pair of second divided portions 40, 40 divided over the entire length in the axial direction (direction perpendicular to the plane of FIG. 3) of the male terminal inserting tube portion 24 are formed at another circumferential position of the male terminal inserting tube portion 24 by mutually facing peripheral end parts of the pair of curved portions 21, 21 located on the side of the base end part 34 of the female terminal fitting 16. A pair of extending plate portions 42, 42 are provided which are connected to the pair of second divided portions 40, 40 and separated from each other and project outward (rightward in FIG. 3). Side walls 44, 44 projecting toward mating sides are provided on extending end parts of the pair of extending plate portions 42, 42, and extending end parts of the pair of extending plate portions 42, 42 are formed into a tubular shape by bringing the side walls 44 into contact. The extending end parts of the pair of extending plate portions 42, 42 are connected to the wire crimping portion 46 provided in the base end part 34 of the female terminal fitting 16. The pair of extending plate portions 42, 42 are arranged to face each other across a clearance over the entire length in the length direction. Moreover, pairs of projections 48, 48 are formed by both widthwise side end parts projecting outward in the width direction and substantially in the form of rectangular flat plates in a plan view in tip parts of the pair of extending plate portions 42, 42, and are engaged with the unillustrated male terminal cover.

In the wire crimping portion 46, a core 52 of a wire 50 is conductively connected to the female terminal fitting 16. The wire 50 is so structured that the core 52 serving as a conductor and formed by twisting a plurality of metal wires made of copper, aluminum or the like is covered with an insulation coating 54 having an electrically insulating property and made of ethylene-based resin, styrene-based resin or the like. The wire crimping portion 46 of the female terminal fitting 16 is crimped to the core 52 exposed by stripping the insulation coating 54 in an end of the wire 50 using a known crimping technique, whereby the core 52 of the wire 50 is conductively connected to the female terminal fitting 16.

<Clip 18>

The clip 18 is assembled with and held on the female terminal fitting 16 (see, for example, FIGS. 1 and 3). The clip 18 is formed using a strip plate made of one of various metal materials, which can be press-worked or punched, such as spring steel, stainless steel, brass, phosphor bronze and beryllium copper. The clip 18 includes a coupling plate portion 56 in the form of a rectangular flat plate and a pair of sandwiching plate portions 58, 58 in the form of rectangular flat plates projecting in directions approaching each other from both side edge parts of the coupling plate portion 56. Projecting end parts of the pair of sandwiching plate portions 58, 58 are slightly bent in directions separating from each other. A clearance between the closest parts of the projecting end parts of the pair of sandwiching plate portions 58, 58 serves as an insertion opening 60. Lock holes 62 having a rectangular cross-sectional shape are provided to penetrate in a plate thickness direction through the pair of sandwiching plate portions 58, 58 in a substantially central part of the insertion opening 60.

For example, as shown in FIGS. 1 and 3, the clip 18 is assembled with the tip part 22 of the female terminal fitting 16. That is, the pair of overlapping plate portions 30, 30 provided in the tip part 22 of the female terminal fitting 16 are press-fit between the pair of sandwiching plate portions 58, 58 of the clip 18 through the insertion opening 60 of the clip 18. At this time, the pair of sandwiching plate portions 58, 58 are resiliently deformed in the directions separating from each other, thereby riding over the lock claws 32 provided on the pair of overlapping plate portions 30, 30. Thereafter, the pair of sandwiching plate portions 58, 58 resiliently return, whereby the lock claws 32 are fit into the lock holes 62 provided in the pair of sandwiching plate portions 58, 58 and the clip 18 is inseparably held on the female terminal fitting 16. Since the clip 18 can be held on the pair of overlapping plate portions 30, 30 of the female terminal fitting 16 by a simple structure of fitting the lock claws 32 into the lock holes 62, the female terminal 10 can be simplified in structure and reduced in size. As a result, the tip parts in the projecting direction of the pair of overlapping plate portions 30, 30 are sandwiched between the pair of sandwiching plate portions 58, 58 of the clip 18. Further, the pair of overlapping plate portions 30, 30 are biased to be overlapped each other between the pair of sandwiching plate portions 58, 58 by resilient restoring forces of the pair of sandwiching plate portions 58, 58. Further, the pairs of protection wall portions 36, 36 are arranged outwardly of the pair of sandwiching plate portions 58, 58 of the clip 18 in the width direction. In this way, both widthwise sides of the pair of sandwiching plate portions 58, 58 of the clip 18 can be protected by the pairs of protection wall portions 36, 36. Therefore, the interference of the clip 18 and unillustrated other members, troubles such as the detachment of the clip 18 from the female terminal fitting 16 when an external force is applied can be reduced or eliminated. Further, the pairs of protection wall portions 36, 36 can function as guides in mounting the clip 18 on the pair of overlapping plate portions 30, 30. Therefore, it is also possible to improve the assembling workability of the female terminal 10.

<Housing 20>

The female terminal fitting 16 having the clip 18 assembled with the tip part 22 is used by being accommodated in the housing 20. The housing 20 is formed of insulating synthetic resin. The housing 20 is in the form of a laterally long rectangular tube box open on one side (right side in FIG. 3) in the length direction, and includes one female terminal accommodation chamber 64 (see, for example, FIG. 3) for accommodating the female terminal 10 with one wire 50. As shown in FIG. 3, the female terminal accommodation chamber 64 is provided with a narrow tip accommodation chamber **64*a* having a rectangular cross-sectional shape on a tip (left end side in FIG. 3) and provided with a base end side accommodation chamber 64*b* having a rectangular cross-sectional shape in the other part. The tip accommodation chamber 64*a* is narrowed by making a tip part of a peripheral wall 66 constituting the housing 20 thicker than in the other part. Further, a male terminal insertion hole 68 having a circular cross-sectional shape and rectangular cross-sectional shapes connected to the circular cross-sectional shape and extending toward both sides in the length direction is provided to penetrate through a tip side of the peripheral wall 66 constituting the housing 20 on one widthwise side (lower side in a direction perpendicular to the plane of FIG. 3**).

Figure 4:
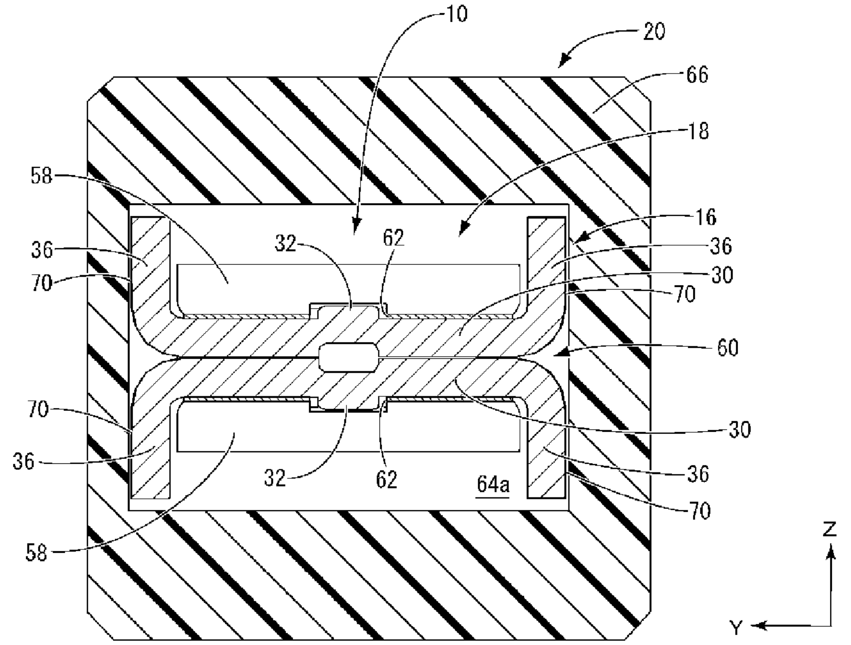
FIG. 4 is an enlarged section along IV-IV in FIG. 2.
Figure 5:
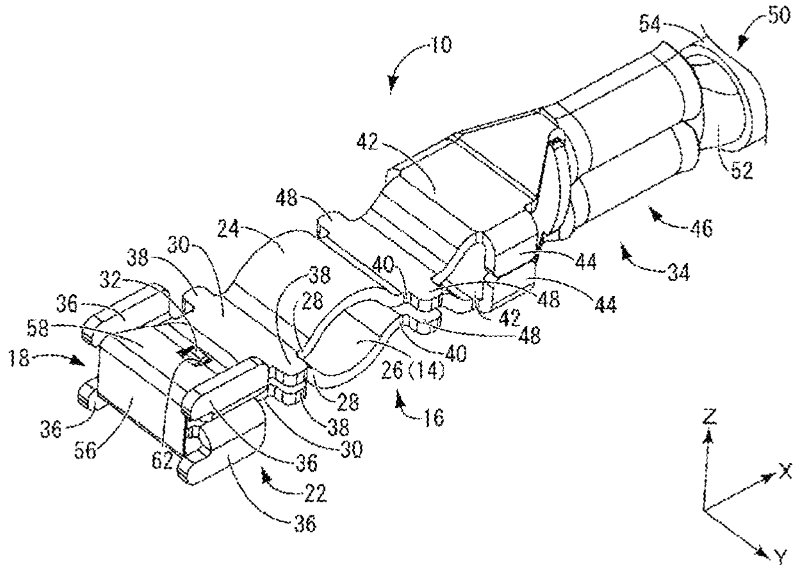
FIG. 5 is a perspective view showing a state where the female terminal shown in FIG. 1 is rotated 180° with a length direction as an axis of rotation.
Figure 6A:
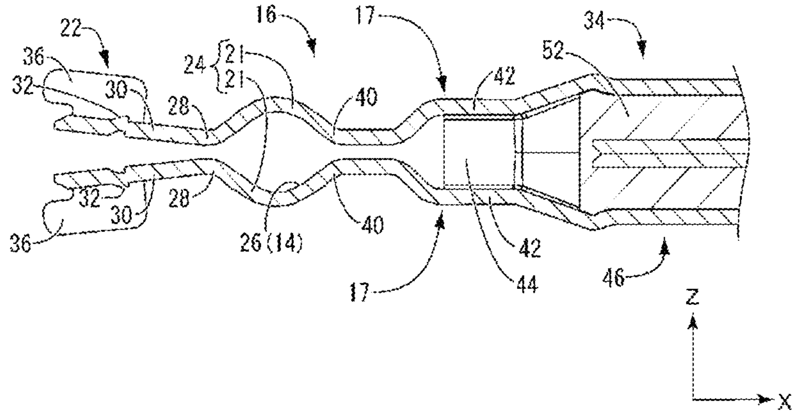
FIG. 6 is a section of the female terminal fitting shown in FIG. 3 showing a state before a pair of overlapping plate portions are biased by a biasing means.
Figure 6B:
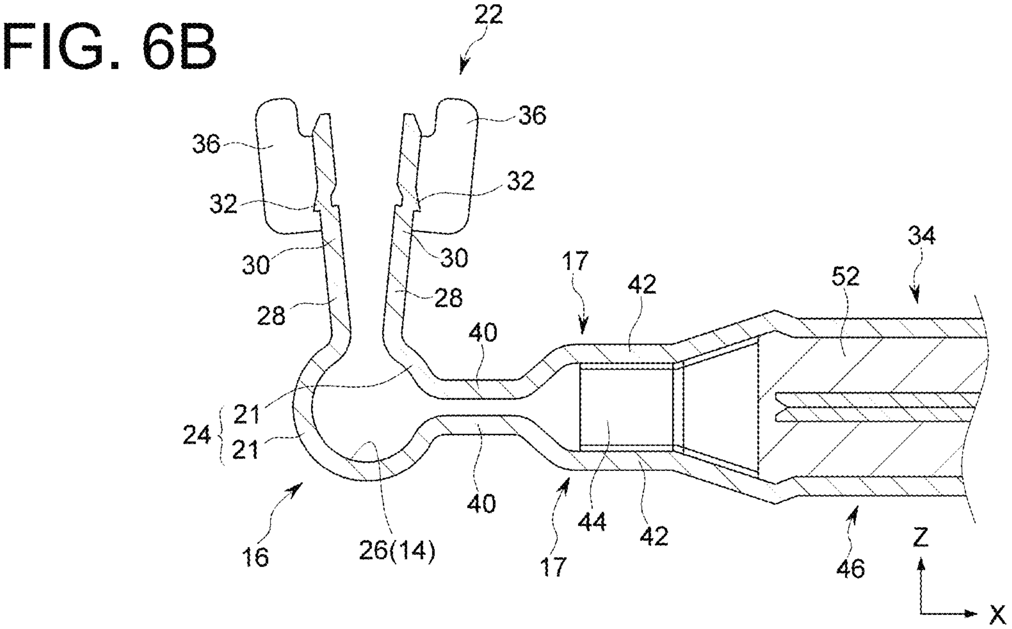

The female terminal fitting 16 having the clip 18 assembled with the tip part 22 is inserted and accommodated into the housing 20 from the side where the clip 18 is assembled. As a result, the tip parts of the pair of overlapping plate portions 30, 30 assembled with the clip 18 are accommodated into the tip accommodation chamber 64*a* of the housing 20. In this way, as shown in FIG. 4, contact supporting surfaces 70 to be brought into contact with and supported by the inner surface of the tip accommodation chamber 64*a* of the housing 20 into which the female terminal fitting 16 is accommodated are constituted by the outer surfaces of the pairs of the protection wall portions 36, 36. Therefore, the female terminal fitting 16 can be stably held in the housing 20. Further, a displacement and the like of the female terminal 10 in press-fitting the male terminal 12 into the male terminal inserting tube portion 24 of the female terminal fitting 16 as described later can be prevented, and the smooth insertion of the male terminal 12 can be stably maintained. Further, since an insertion force of the male terminal 12 can be dispersed to the side of the housing 20, the durability of the female terminal 10 and the like are also improved.

Next, functions and effects of this embodiment are described. In the female terminal 10 of this embodiment, the male terminal 12 is press-fit into the female terminal 10 accommodated in the housing 20 through the male terminal insertion hole 68 of the housing 20. In press-fitting the male terminal 12 into the male terminal inserting tube portion 24 of the female terminal 10, the male terminal inserting tube portion 24 of the female terminal 10 is resiliently deformed in a diameter expanding direction, i.e. a direction to separate the pair of first divided portions 28, 28 from each other, against resilient restoring forces of the pair of sandwiching plate portions 58, 58 of the clip 18. In this way, the male terminal 12 is allowed to be press-fit into the male terminal inserting tube portion 24 of the female terminal 10.

The inner surface 26 of the male terminal inserting tube portion 24 constituting the connecting portion 14 is divided over the entire length in the axial direction at one position, thereby forming the pair of first divided portions 28, 28, and the pair of overlapping plate portions 30, 30 connected to the pair of first divided portions 28, 28 are press-fit between the pair of sandwiching plate portions 58, 58 of the clip 18 through the insertion opening 60 of the clip 18. In this way, the pair of overlapping plate portions 30, 30 are biased to be overlapped each other between the pair of sandwiching plate portions 58, 58 by resilient restoring forces of the pair of sandwiching plate portions 58, 58. Thus, when the male terminal 12 is press-fit into the male terminal inserting tube portion 24 of the female terminal 10, the male terminal inserting tube portion 24 of the female terminal 10 is resiliently deformed in the diameter expanding direction against the resilient restoring forces of the pair of sandwiching plate portions 58, 58 of the clip 18 and the male terminal 12 is allowed to be press-fit into the male terminal inserting tube portion 24. Therefore, a press-contact state can be maintained while an insertion force in inserting the male terminal 12 into the inside of the inner surface 26 of the male terminal inserting tube portion 24 constituting the connecting portion 14 of the female terminal 10 is advantageously reduced. Further, since a force in a diameter reducing direction is applied to the male terminal inserting tube portion 24 by the resilient restoring forces of the pair of sandwiching plate portions 58, 58 of the clip 18, the connecting portion 14 (inner surface 26 of the male terminal inserting tube portion 24) of the female terminal 10 can be brought into contact with the male terminal 12 press-fit into the male terminal inserting tube portion 24 with a large contact pressure. Further, if a certain external force is applied to the male terminal 12, this external force is transmitted in a radially outward direction of the male terminal inserting tube portion 24 and a transmission direction of the external force is different from the overlapping directions, which are biasing directions of the pair of overlapping plate portions 30, 30 by the clip 18. Therefore, a variation of the contact pressure between the female terminal 10 and the male terminal 12 due to the external force transmitted to the male terminal 12 can be advantageously reduced or prevented, and an improvement in conduction stability between the female terminal 10 and the male terminal 12 can also be ensured.

Further, since the clip 18 is assembled with the female terminal fitting 16 before the male terminal 12 is press-fit, it is not necessary to mount a separate spring member or the like to sandwich conductively connected parts after a male terminal is conductively connected to a female terminal like a conventional structure. Therefore, a work process can be simplified and a high contact pressure between the female terminal 10 and the male terminal 12 can be realized by excellent workability. Moreover, the clip 18 has a simple configuration including the coupling plate portion 56 and the pair of sandwiching plate portions 58, 58 projecting from the coupling plate portion 56. Therefore, the enlargement of the female terminal 10 itself, with which the clip 18 is assembled, can be advantageously avoided.

In the female terminal fitting 16, the male terminal inserting tube portion 24 is divided over the entire length in the axial direction at another circumferential position, thereby forming the pair of second divided portions 40, 40. Since the male terminal inserting tube portion 24 is easily resiliently deformed in this way, the insertion force of the male terminal 12 into the male terminal inserting tube portion 24 can be reduced. In addition, the pair of extending plate portions 42, 42 connected to and projecting from the pair of second divided portions 40, 40 are connected to the wire crimping portion 46. Thus, the pair of extending plate portions 42, 42 can be easily connected to the wire crimping portion 46 having a relatively large diameter. Further, the pair of extending plate portions 42, 42 are arranged to face each other across a clearance over the entire length in the length direction. Therefore, the contact of the pair of extending plate portions 42, 42 can be advantageously avoided, and it can be avoided that the deformation of the male terminal inserting tube portion 24 in the diameter expanding direction is hindered to increase the insertion force.

Other Embodiments

The technique described in this specification is not limited to the above described and illustrated embodiment. For example, the following embodiments are also included in the technical scope of the technique described in this specification.

Figure 7:
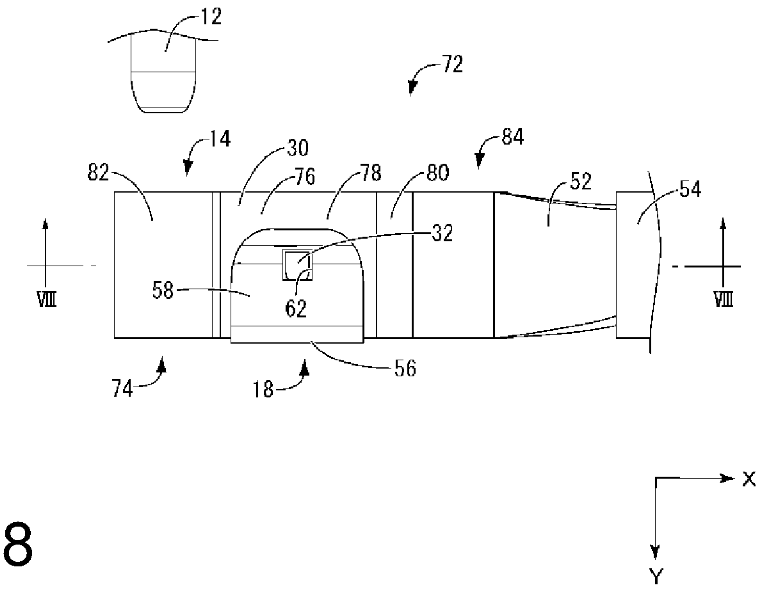
FIG. 7 is a plan view showing a female terminal according to a second embodiment.
Figure 8:
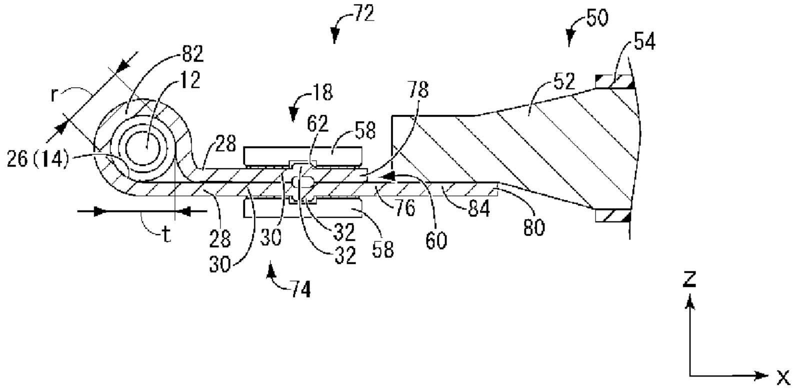
FIG. 8 is a section along VIII-VIII in FIG. 7.

(1) Although the female terminal fitting 16 is formed by press-working the metal plate material into the predetermined shape in the above first embodiment, there is no limitation to this. A female terminal fitting 74 may be configured to include a strip-like metal flat plate 76 as in a female terminal 72 of a second embodiment of the present disclosure shown in FIGS. 7 and 8. Specifically, one end part 78 in a longitudinal direction of the metal flat plate 76 constituting one of a pair of overlapping plate portions 30, 30 is folded toward another end part 80 and overlapped on the other of the pair of overlapping plate portions 30, 30 provided on the side of the other end part 80. In this way, a longitudinal intermediate part of the metal flat plate 76 is curved to provide a male terminal inserting tube portion 82. Further, the other end part 80 of the metal flat plate 76 constituting the female terminal fitting 74 serves as a wire connecting portion 84, and a clip 18 serving as a biasing means for biasing the pair of overlapping plate portions 30, 30 in directions toward each other is disposed and held between the wire connecting portion 84 and the male terminal inserting tube portion 82.

In this way, the female terminal fitting 74 provided with a pair of first divided portions 28, 28, the pair of overlapping plate portions 30, 30 connected to the first divided portions 28, separated from each other and projecting outward and the male terminal inserting tube portion 82 can be easily manufactured in a high yield by a simple structure of folding the one end part 78 of the strip-like metal flat plate 76 toward the other end part 80. Further, the other end part 80 of the metal flat plate 76 serves as the wire connecting portion 84 and the clip 18 is disposed and the held between the wire connecting portion 84 and the male terminal inserting tube portion 82, whereby a separation distance from the wire connecting portion 84 to the male terminal inserting tube portion 82 is ensured. In this way, the male terminal inserting tube portion 82 can be advantageously protected from thermal effect in connecting a core 52 exposed at an end of a wire 50 to the wire connecting portion 84 by welding or the like, and influences and the like on plating characteristics by the thermal effect can be reduced or avoided.

(2) Although the circumferential position of the pair of second divided portions 40, 40 provided in the male terminal inserting tube portion 24 is a position opposite to the pair of first divided portions 28, 28 in the circumferential direction in the above first embodiment, there is no limitation to this. This position can be arbitrarily set depending on conditions such as an arrangement region of the female terminal 10. For example, the first divided portions 28 and the second divided portions 40 may be provided at positions separated by 90° in the circumferential direction of the male terminal inserting tube portion 24 and the overlapping plate portion 30, 30 and the extending plate portions 42 may be configured to project in directions orthogonal to each other.

(3) Although the wire 50 crimped to the wire crimping portion 46 or wire connecting portion 84 extends in the direction orthogonal to the axial direction of the male terminal inserting tube portion 24, 82 in the above first and second embodiments, the wire 50 may be crimped to the wire crimping portion 46 or wire connecting portion 84 to extend in the axial direction of the male terminal inserting tube portion 24, 82.

(4) Although the male terminal inserting tube portion 24, 82 has a substantially hollow cylindrical shape in the above first and second embodiments, there is no limitation to this. The male terminal inserting tube portion 24, 82 may have a rectangular, elliptical or polygonal cross-sectional shape in conformity with the cross-sectional shape of the male terminal 12 to be inserted.

LIST OF REFERENCE NUMERALS

10 female terminal (first embodiment)
12 male terminal
14 connecting portion
16 female terminal fitting
17 projecting piece
18 clip
20 housing
21 curved portion
22 tip part
24 male terminal inserting tube portion
26 inner surface
28 first divided portion
30 overlapping plate portion
32 lock claw
34 base end part
36 protection wall portion
38 projection
40 second divided portion
42 extending plate portion
44 side wall
46 wire crimping portion
48 projection
50 wire
52 core
54 insulation coating
56 coupling plate portion
58 sandwiching plate portion
60 insertion opening
62 lock hole
64 female terminal accommodation chamber
64*a* tip accommodation chamber
64*b* base end side accommodation chamber
66 peripheral wall
68 male terminal insertion hole
70 contact supporting surface
72 female terminal (second embodiment)
74 female terminal fitting
76 metal flat plate
78 one end part
80 another end part
82 male terminal inserting tube portion
84 wire connecting portion

What is claimed is:

1. A female terminal, comprising:

a female terminal fitting including a connecting portion to be conductively connected to a male terminal;

a male terminal inserting tube portion provided in the female terminal fitting, the male terminal inserting tube portion constituting the connecting portion by an inner surface to be press-fit by the male terminal;

a pair of first divided portions provided by dividing the male terminal inserting tube portion over an entire length in an axial direction at one circumferential position, a pair of overlapping plate portions connected to the pair of first divided portions, the pair of overlapping plate portions being and separated from each other and projecting outward;

a pair of second divided portions provided by dividing the male terminal inserting tube portion over the entire length in the axial direction at another circumferential position;

a pair of extending plate portions connected to the pair of second divided portions and projecting outward; and a clip held on the female terminal fitting, the clip including a coupling plate portion and a pair of sandwiching plate portions projecting in directions approaching each other from both side edge parts of the coupling plate portion such that a clearance serving as an insertion opening is provided between projecting end parts of the pair of sandwiching plate portions, wherein:

the pair of overlapping plate portions press-fit between the pair of sandwiching plate portions through the insertion opening of the clip are pressed by resilient restoring forces of the pair of sandwiching plate portions such that the pair of overlapping plate portions come into contact with each other between the pair of sandwiching plate portions, the male terminal inserting tube portion is resiliently deformed in a diameter expanding direction due to the resilient restoring forces of the pair of sandwiching plate portions to cause the male terminal to be press-fit into the male terminal inserting tube portion when the male terminal is press-fit into the male terminal inserting tube portion, the first divided portions and the second divided portions are provided at positions separated by 90° in the circumferential direction of the male terminal inserting tube portion, and the overlapping plate portion and the extending plate portions are configured to project in directions orthogonal to each other.

2. The female terminal according to claim 1, wherein the clip is held on the female terminal fitting by engagement of lock holes provided in either the pair of sandwiching plate portions or the pair of overlapping plate portions, the pair of sandwiching plate portions being respectively overlapped on the pair of overlapping plate portions, and lock claws provided on the others.

3. The female terminal according to claim 1, wherein:

extending end parts of the pair of extending plate portions are connected to a wire crimping portion provided in a base end part of the female terminal fitting and the pair of extending plate portions are arranged to face each other across a clearance over an entire length.

4. The female terminal according to claim 1, wherein tip parts in a projecting direction of the pair of overlapping plate portions are sandwiched between the pair of sandwiching plate portions of the clip, and both side end parts in a width direction of the tip parts of the pair of overlapping plate portions are bent toward sides opposite to overlapping directions, thereby providing pairs of protection wall portions arranged outwardly of the pair of sandwiching plate portions of the clip in the width direction.

5. The female terminal according to claim 4, wherein outer surfaces of the pairs of protection wall portions constitute contact supporting surfaces to be brought into contact with and supported by an inner surface of a housing into which the female terminal fitting is accommodated.

* * * * *